US011368846B2

(12) United States Patent
Tsai et al.

(10) Patent No.: US 11,368,846 B2
(45) Date of Patent: Jun. 21, 2022

(54) THREAT DETECTION APPARATUS AND THREAT DETECTION METHOD THEREFOR FOR WIRELESS COMMUNICATION SYSTEM

(71) Applicant: Institute For Information Industry, Taipei (TW)

(72) Inventors: Yi-Hsueh Tsai, Taipei (TW); Shun-Ming Wang, Taipei (TW)

(73) Assignee: INSTITUTE FOR INFORMATION INDUSTRY, Taipei (TW)

(*) Notice: Subject to any disclaimer, the term of this patent is extended or adjusted under 35 U.S.C. 154(b) by 472 days.

(21) Appl. No.: 16/679,227

(22) Filed: Nov. 10, 2019

(65) Prior Publication Data
US 2021/0099885 A1  Apr. 1, 2021

(30) Foreign Application Priority Data

Sep. 27, 2019 (TW) .................. 108135212

(51) Int. Cl.
*H04L 27/00* (2006.01)
*H04W 12/122* (2021.01)
(Continued)

(52) U.S. Cl.
CPC ......... *H04W 12/122* (2021.01); *H04L 5/0048* (2013.01); *H04W 24/08* (2013.01); *H04W 24/10* (2013.01); *H04W 64/00* (2013.01); *H04W 72/0406* (2013.01); *H04W 72/0446* (2013.01); *H04W 88/08* (2013.01)

(58) Field of Classification Search
CPC ..... H94W 64/00; H04W 88/02; H04W 24/10; H04W 24/08; H04W 72/005;
(Continued)

(56) References Cited

U.S. PATENT DOCUMENTS 8,639,209 B2    1/2014  Walby et al.
11,102,693 B1*  8/2021  Fang ................. H04L 43/0864
(Continued)

FOREIGN PATENT DOCUMENTS

CA        2746413 C      9/2014

OTHER PUBLICATIONS

"Accurate Positioning Using Beamforming" Hyunmin Seo†, Hyunsoo Kim, Taehyung Kim, Student Member, IEEE, and Daesik Hong‡, Fellow, IEEE, 2021 IEEE 18th Annual Consumer Communications & Networking Conference (CCNC) (Year: 2021).*
(Continued)

*Primary Examiner* — Khai Tran
(74) *Attorney, Agent, or Firm* — Maschoff Brennan

(57) ABSTRACT

A threat detection apparatus and a threat detection method thereof for a wireless communication system are provided. The threat detection apparatus receives an observed time difference of arrival (OTDOA) message for positioning a user equipment (UE) from a serving base station (BS), and determines that the UE connects to a false BS when the identity of the serving BS is not on the identity list. If the identity of the serving BS is on the identity list, the threat detection apparatus calculates a first distance according to the measurement report message transmitted from the UE, and calculates a second distance between the UE and the serving BS according to the OTDOA message. When the difference between the first distance and the second distance is larger than a threshold, the threat detection apparatus determines that the UE connects to the false BS.

19 Claims, 11 Drawing Sheets

(51) Int. Cl.
*H04W 24/08* (2009.01)
*H04W 24/10* (2009.01)
*H04L 5/00* (2006.01)
*H04W 64/00* (2009.01)
*H04W 72/04* (2009.01)
*H04W 88/08* (2009.01)

(58) Field of Classification Search
CPC ........ H04W 40/20; G05S 5/0036; G01S 5/10; H04B 17/27; H04B 17/309; H04L 63/20; H04L 63/1441
USPC ......................................................... 375/326
See application file for complete search history.

(56) References Cited

U.S. PATENT DOCUMENTS

| | | | |
|---|---|---|---|
| 2007/0079376 A1 | 4/2007 | Robert et al. | |
| 2017/0026792 A1* | 1/2017 | Singh | .................... G01S 5/0236 |
| 2017/0171714 A1* | 6/2017 | Cai | ........................ H04W 4/025 |
| 2018/0159641 A1* | 6/2018 | Xu | ........................... H04W 4/12 |
| 2019/0182794 A1* | 6/2019 | Wong | .................... H04W 64/00 |

OTHER PUBLICATIONS

3GPP TR 33.809 V0.4.0; "3rd Generation Partnership Project; Technical Specification Group Services and System Aspects; Study on 5G Security Enhancement against False Base Stations (Release 16)"; May 2019; 49 pages.

Office Action to the corresponding Taiwan Patent Application rendered by the Taiwan Intellectual Property Office (TIPO) dated May 27, 2020, 8 pages (including English translation).

Office Action to the corresponding Taiwan Patent Application rendered by the Taiwan Intellectual Property Office (TIPO) dated Feb. 24, 2021, 6 pages.

\* cited by examiner

THREAT DETECTION APPARATUS AND THREAT DETECTION METHOD THEREFOR FOR WIRELESS COMMUNICATION SYSTEM

PRIORITY

This application claims priority to Taiwan Patent Application No. 108135212 filed on Sep. 27, 2019, which is hereby incorporated by reference in its entirety.

FIELD

The present invention relates to a threat detection apparatus and a threat detection method thereof for a wireless communication system. More particularly, the threat detection apparatus determines whether a UE connects to a false BS based on the observed time difference of arrival (OTDOA).

BACKGROUND

With the rapid development of wireless communication technologies, wireless communication has found wide application in people's life, and people's demand for wireless communication is increasing. As the wireless devices are everywhere now, by using a false BS to monitor the every signaling transmission in the wireless communication system, unscrupulous people have a chance to attack the UEs, the BSs or the core network in the wireless communication system, or to steal private data from the UEs for fraud or deception.

Currently, the false BS defense mechanisms proposed by industry and academics adopt the authentication methods (e.g., the digital signature with timestamp) to detect and avoid the situation that a UE connects to a false BS. However, it needs to modify the protocols of the wireless communication system if adopting these authentication mechanisms. Under such circumstance, the core network, the BSs and the UEs should also be correspondingly modified (e.g., by updating the firmware), otherwise they will be unable to support these authentication mechanisms to have the defense against the false BS. Therefore, the currently proposed false BS defense mechanisms will cause huge engineering cost and obviously lack economic efficiency.

Accordingly, an urgent need exists in the art to provide a threat detection mechanism to detect the existence of a false BS without need of modifying the current wireless communication protocols.

SUMMARY

An objective is to provide a threat detection mechanism which determines whether a UE connects to a false BS based on the measurement message reported by the UE. Accordingly, the threat detection mechanism is able to detect the existence of a false BS without the need of modifying the current wireless communication protocols.

The disclosure includes a threat detection apparatus for a wireless communication system. The wireless communication system can comprise a core network and a plurality of authorized base stations (BSs). The threat detection apparatus belongs to the core network and comprises a network interface and a processor. The network interface is configured to connect to the authorized BSs. The processor is electrically connected to the network interface, and is configured to execute the following operations: receiving an observed time difference of arrival (OTDOA) message from a serving BS of the authorized BSs via the network interface and calculating a position of a user equipment (UE) according to the OTDOA message, the OTDOA message being generated by the UE and comprising an identity list; determining whether an identity of the serving BS is on the identity list; and determining that the UE connects to a false BS when the identity of the serving BS is not on the identity list. When the identity of the serving BS is on the identity list, the processor further executes the following operations: receiving a measurement report message from the serving BS via the network interface, the measurement report message being generated by the UE through measuring a reference signal transmitted by a BS; calculating a first distance between the UE and the BS according to the measurement report message; calculating a second distance between the UE and the serving BS according to the position; determining whether a difference between the first distance and the second distance is larger than a threshold; and when the difference is larger than the threshold, determining that the UE connects to the false BS and the BS is the false BS.

Also disclosed is a threat detection method for a wireless communication system. The wireless communication system can comprise a core network and a plurality of authorized base stations (BSs). The core network comprises a threat detection apparatus. The threat detection apparatus comprises a network interface and a processor. The threat detection method is executed by the processor and comprises the following steps: receiving an observed time difference of arrival (OTDOA) message from a serving BS of the authorized BSs and calculating a position of a user equipment (UE) according to the OTDOA message, the OTDOA message being generated by the UE and comprising an identity list; determining whether an identity of the serving BS is on the identity list; and determining that the UE connects to a false BS when the identity of the serving BS is not on the identity list. When the identity of the serving BS is on the identity list, the threat detection method further comprises the following steps: receiving a measurement report message from the serving BS, the measurement report message being generated by the UE through measuring a reference signal transmitted by a BS; calculating a first distance between the UE and the BS according to the measurement report message; calculating a second distance between the UE and the serving BS according to the position; determining whether a difference between the first distance and the second distance is larger than a threshold; and when the difference is larger than the threshold, determining that the UE connects to the false BS and the BS is the false BS.

Further disclosed is a threat detection apparatus for a wireless communication system. The wireless communication system can comprise a core network and a plurality of authorized base stations (BSs). The threat detection apparatus belongs to the core network and comprises a network interface and a processor. The network interface is configured to connect to the authorized BSs. The processor is electrically connected to the network interface, and is configured to execute the following operations: receiving an observed time difference of arrival (OTDOA) message from a serving BS of the authorized BSs via the network interface, the OTDOA message being generated by a user equipment (UE); calculating a first position of the UE according to the OTDOA message; receiving an uplink time difference of arrival (UTDOA) message from each of the serving BS and a plurality of assigned BSs of the authorized BSs via the network interface; calculating a second position of the UE according to the UTDOA messages; determining whether a distance difference between the first position and the second position is larger than a threshold; and determining that the UE connects to a false BS when the distance difference is larger than the threshold.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to certain example embodiments thereof. These example embodiments are not intended to limit the present invention to any particular environment, example, applications, embodiments or implementations described in these example embodiments. Therefore, description of these example embodiments is only for purpose of illustration rather than to limit the present invention.

It shall be appreciated that in the following embodiments and the attached drawings, elements unrelated to the present invention are omitted from depiction; and dimensional relationships among individual elements in the attached drawings are illustrated only for ease of understanding, but not to limit the actual scale.

Figure 1:
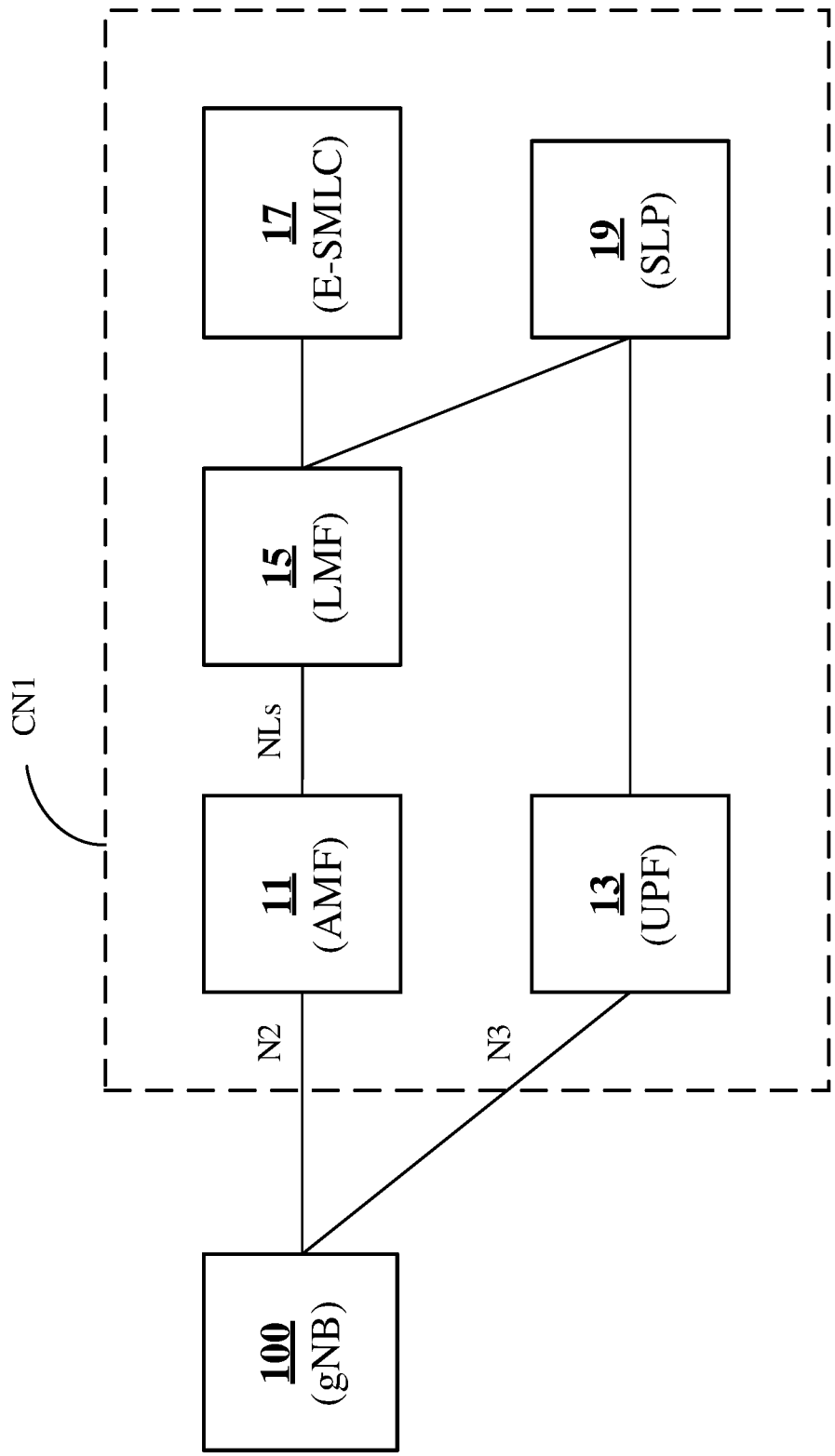
FIG. 1 depicts a system structure of a wireless communication system according to the present invention.
Figure 2:
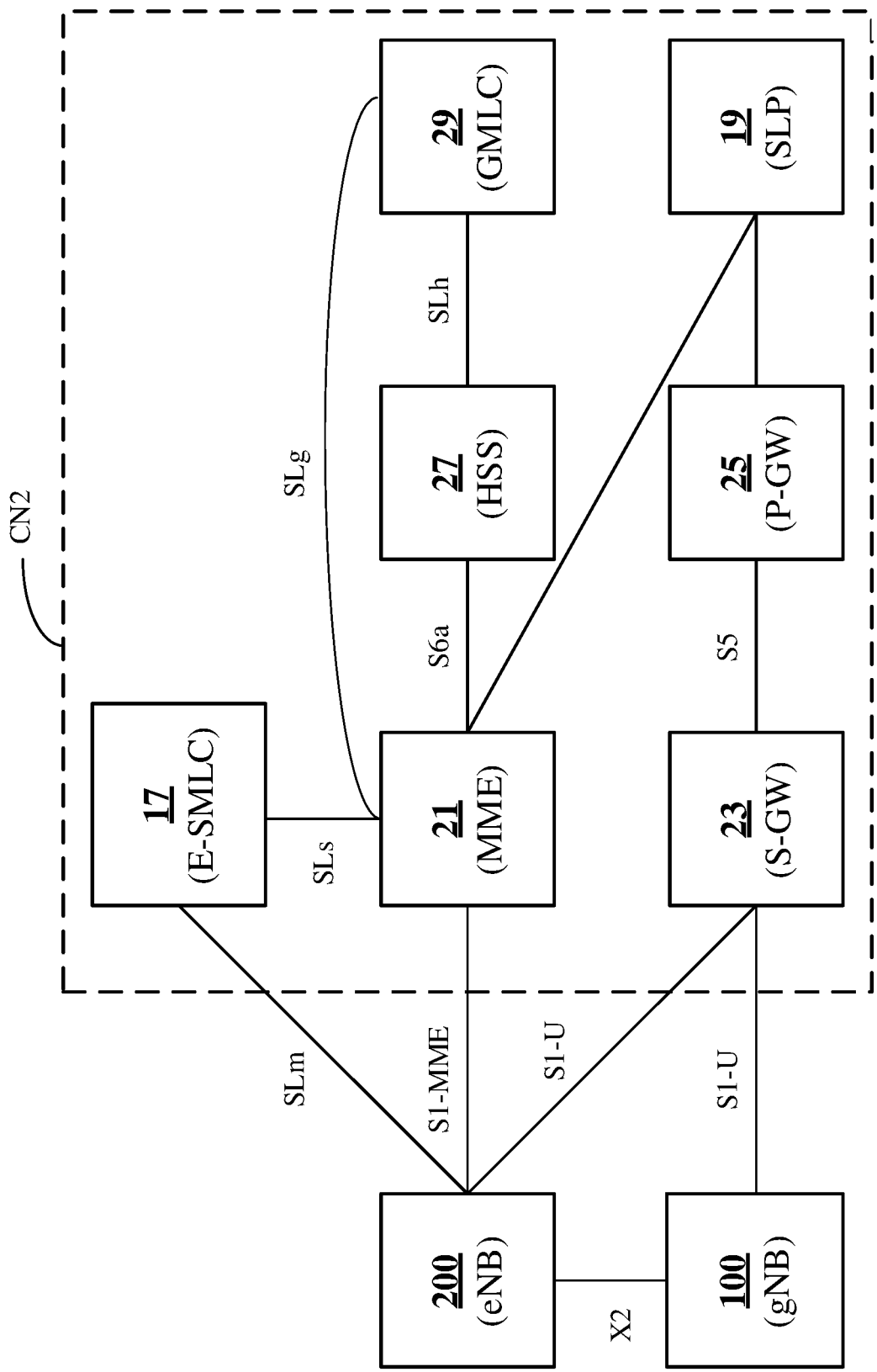
FIG. 2 depicts a system structure of a wireless communication system according to the present invention.

Please refer to FIG. 1 to FIG. 6 for the first embodiment of the present invention. The wireless communication system includes a core network and a plurality of authorized base stations (BSs), and the core network includes the threat detection apparatus 1 of the present invention. FIG. 1 depicts a standalone (SA) system structure of the wireless communication system which is the 5G mobile communication system, and FIG. 2 depicts a non-standalone (NSA) system structure of the wireless communication system which is integrated by the 4G and 5G mobile communication systems.

In FIG. 1, the core network CN1 in the SA system structure may be constituted by a plurality of entities such as an access and mobility management function (AMF) 11, a user plane function (UPF) 13, a location management function (LMF) 15, an enhanced serving mobile location centre (E-SMLC) 17 and a service location protocol (SLP) 19. These entities may be implemented in hardware or software by one or more devices (e.g., the servers) and connected to each other via specific interfaces (e.g., the AMF 11 and the LMF 15 are connected via the NLs interface). The BS 100 (usually called a "gNB") in the 5G mobile communication system is connected to the AMF 11 (e.g., via the N2 interface) and connected to the UPF 13 (e.g., via the N3 interface).

Similarly, in FIG. 2, the core network CN2 in the NSA system structure may be also constituted by a plurality of entities such as the E-SMLC 17, the SLP 19, a mobility management entity (MME) 21, a serving gateway (S-GW) 23, a packet data network gateway (P-GW) 25, a home subscriber server (HSS) 27 and a gateway mobile location center (GMLC) 29.

Likewise, these entities may be implemented in hardware or software by one or more devices (e.g., the servers) and connected to each other via specific interfaces. For example, the E-SMLC 17 and the MME 21 are connected via the SLs interface, the MME 21 and the HSS 27 are connected via the S6a interface, the HSS 27 and the GMLC 29 are connected via the SLh interface, the MME 21 and the GMLC 29 are connected via the SLg interface, and the S-GW 23 and the P-GW 25 are connected via the S5 interface.

The BS 100 (usually called a "gNB") in the 5G mobile communication system and the BS 200 (usually called a "eNB") in the 4G mobile communication system (also called the long term evolution (LTE) mobile communication system) are connected to each other (e.g., connected via the X2 interface). Both the BS 100 and the BS 200 are connected to the S-GW 23 (e.g., via the S1-U interface). Moreover, the BS 100 is further connected to the E-SMLC 17 (e.g., via the SLm interface) and the BS 200 is further connected to the MME 21 (e.g., via the S1-MME interface).

The difference between the SA and the NSA is that the core network CN2 of the NSA is still constituted by the entities of the 4G mobile communication system, so the BS 200 of the 4G mobile communication system and the BS 100 of the 5G mobile communication system are both connected to the core network CN2. In other words, in the NSA system structure, the BS 100 of the 5G mobile communication system can be downward compatible to the 4G mobile communication system. It shall be appreciated that the aforesaid constitution of core networks CN1 and CN2 are well-known to those of ordinary skill in the art, or may be referred to the 3GPP TS 36.3305 specification, the 3GPP TS 36.331 specification, the 3GPP TS 36.455 specification, the 3GPP TS 38.305 specification and the 3GPP TS 38.455 specification (but not limited thereto).

Since the threat detection apparatus 1 of the present invention determines whether the UE connects to a false BS through the location based service (LBS) mechanism, the threat detection apparatus 1 is the device having positioning functionality or being able to obtain the positioning information in the core network, e.g., the E-SMLC 17 in the SA system structure as shown in FIG. 1, and the E-SMLC 17 in the NSA system structure as shown in FIG. 2.

Figure 3:
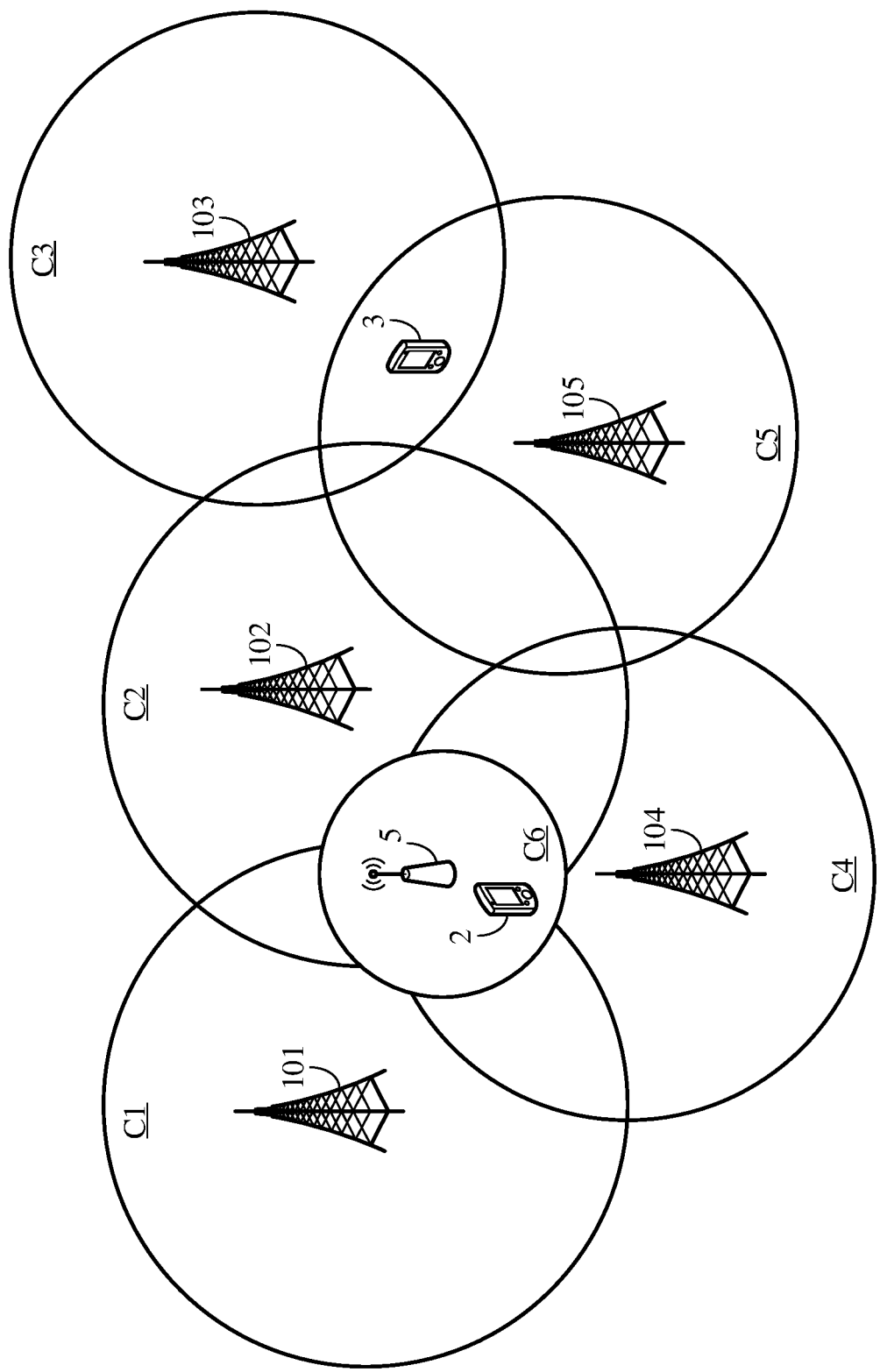
FIG. 3 depicts an implementation scenario of threat detection according to the present invention.
Figure 4:
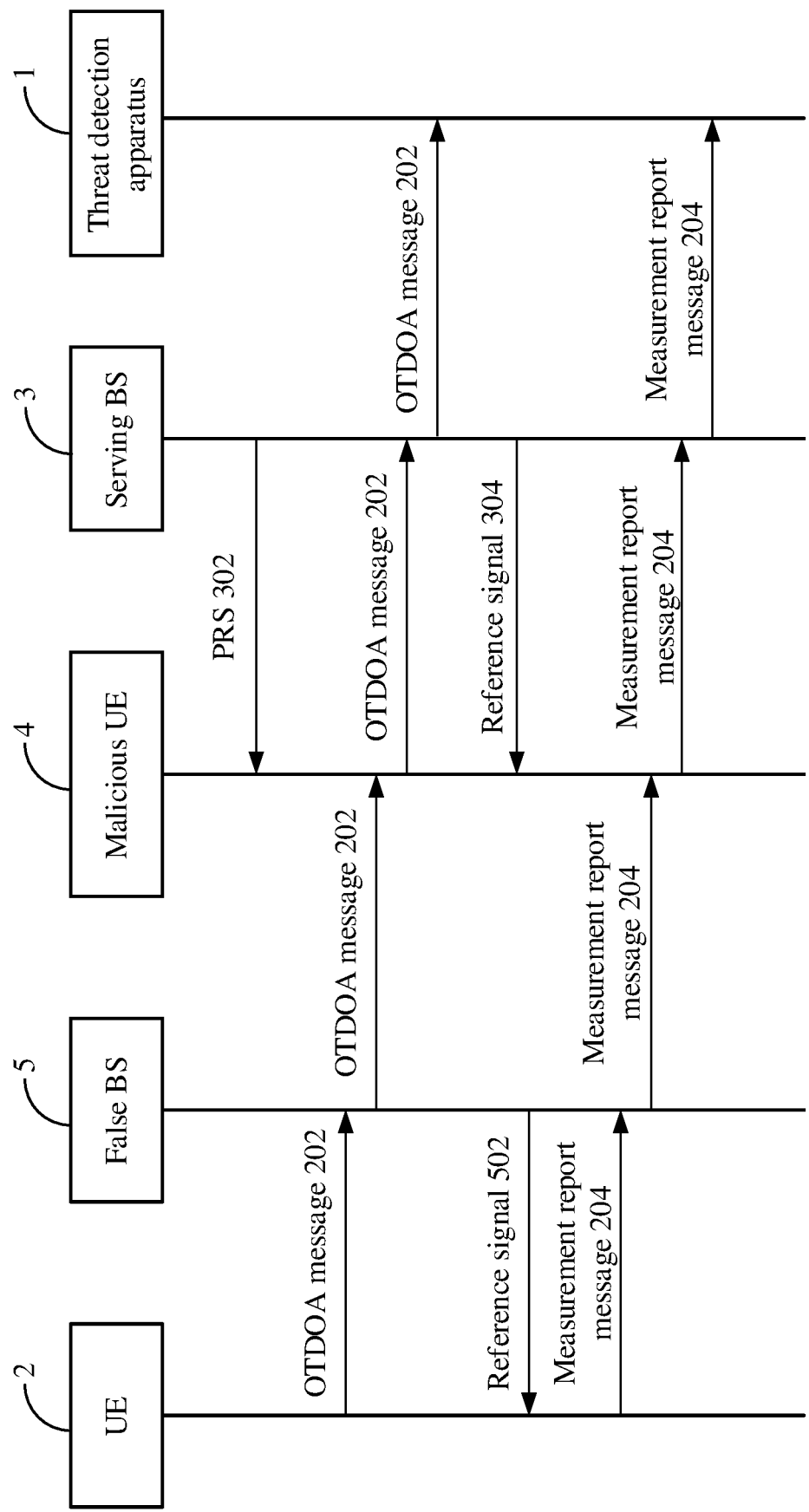
FIG. 4 is a schematic view of signal transmission according to the present invention.

Please refer to FIGS. 3 and 4. For the authorized BSs 101-105, the malicious UE 4 is the same as a general UE, and its connection to an authorize BS is not different from that of the general UE. The malicious UE 4 and the false BS 5 may be connected directly via a transmission line or remotely connected via Internet. Furthermore, the malicious UE 4 and the false BS 5 may be integrated into a device rather than be two separate devices. The false BS 5 can use the malicious UE 4 to request the system information from an authorized BS, and can transmits the same system information as that of the authorized BS after copying and processing the system information received from the malicious UE 4 so that the false BS 5 can attract the surrounding UEs to connect with it. Each of the BSs 101-105 may be the BS 100 in the SA system structure, or may be the BS 100 or the BS 200 in the NSA system structure.

Assuming that the target which the false BS 5 pretend to be is the authorized BS 103, the false system information transmitted by the false BS 5 is the same as the system information transmitted by the authorized BS 103. To attract the UE 2 to connect with it, the false BS 5 will use higher transmission power as compared to the transmission power used by the surrounding authorized BSs so that the UE 2 will determine that the false BS 5 is the most suitable BS to connect to.

When the UE 2 connects to the false BS 5, the false BS 5 uses the malicious UE 4 to connect to the authorized BS 103 to build a false appearance that the UE 2 connects to the authorized BS 103 so that the UE 2 recognized that the serving BS 3, which the UE 2 connects to, is the authorized BS 103. When the UE 2 connects to or handovers to (but not limited thereto) the authorized BS 103, the threat detection apparatus 1 will request the UE 2 to perform the following signal measurement procedure for threat detection accordingly.

For the threat detection, the UE 2 measures the positioning reference signal (PRS) transmitted by each authorized BS, generates an observed time difference of arrival (OTDOA) message 202, and reports the OTDOA message 202 to the threat detection apparatus 1 via the serving BS 3 (i.e., the authorized BS 103). The OTDOA message 202 includes an identity list. Specifically, after receiving the LTE positioning protocol provide assistance data (LPP provide assistance data) transmitted by the E-SMLC 17, the UE 2 will measure the PRSs transmitted by the authorized BSs indicated by the LPP provide assistance data, and generate and transmit the LPP provide location information to the E-SMLC 17 after finishing the measurements. Therefore, OTDOA message 202 carries the LPP provide location information, and the identity list can be retrieved from the LPP provide location information. The identity list includes the relevant identities of the BSs corresponding to the PRSs which the UE 2 has measured. For example, the relevant identities of the BSs, may the BS identities (i.e., the cell IDs).

In the implementation scenario as shown in FIG. 3, the UE 2 is only located within the signal coverage C1 of the authorized BS 101, the coverage C2 of the authorized BS 102 and the signal coverage C4 of the authorized BS 104. If the false BS 5 does not have the capability to copy the PRS of an authorized BS, the PRSs which can be measured by the UE 2 are only the PRSs transmitted by the authorized BSs 101, 102 and 104. Therefore, the identity list included in the OTDOA message 202 generated by the UE 2 may only include the identities of the authorized BSs 101, 102 and 104, and does not include the identities of the authorized BSs 103 and 105.

Since the UE 2 has connected to the false BS 5, the OTDOA message 202 in fact is received by the false BS 5, then transmitted from the false BS 5 to the malicious UE 4, and then transmitted from the malicious UE 4 to the serving BS 3 (i.e., the authorized BS 103). The serving BS 3 receives the OTDOA message 202 and reports it to the threat detection apparatus 1. After receiving the OTDOA message 202 from the serving BS 3, the threat detection apparatus 1 calculates the position of the UE 2 according to the OTDOA message 202, and determines whether the identity of the serving BS 3 is on the identity list (i.e., determines whether the identity of the authorized BS 103 is on the identity list).

When the identity of the serving BS 3 is not on the identity list, it means the UE 2 is supposed not to be located within the signal coverage of the serving BS 3 and could not measure the PRS transmitted by the serving BS 3. Thus, the threat detection apparatus 1 determines that the UE 2 connects to the false BS 5. In other words, if the UE 2 indeed connects to the serving BS 3, the identity of the serving BS 3 shall be on the identity list. As a result, when the identity of the serving BS 3 is not on the identity list, it implies that the UE 2 connects to a false BS (i.e., the false BS 5).

Figure 5:
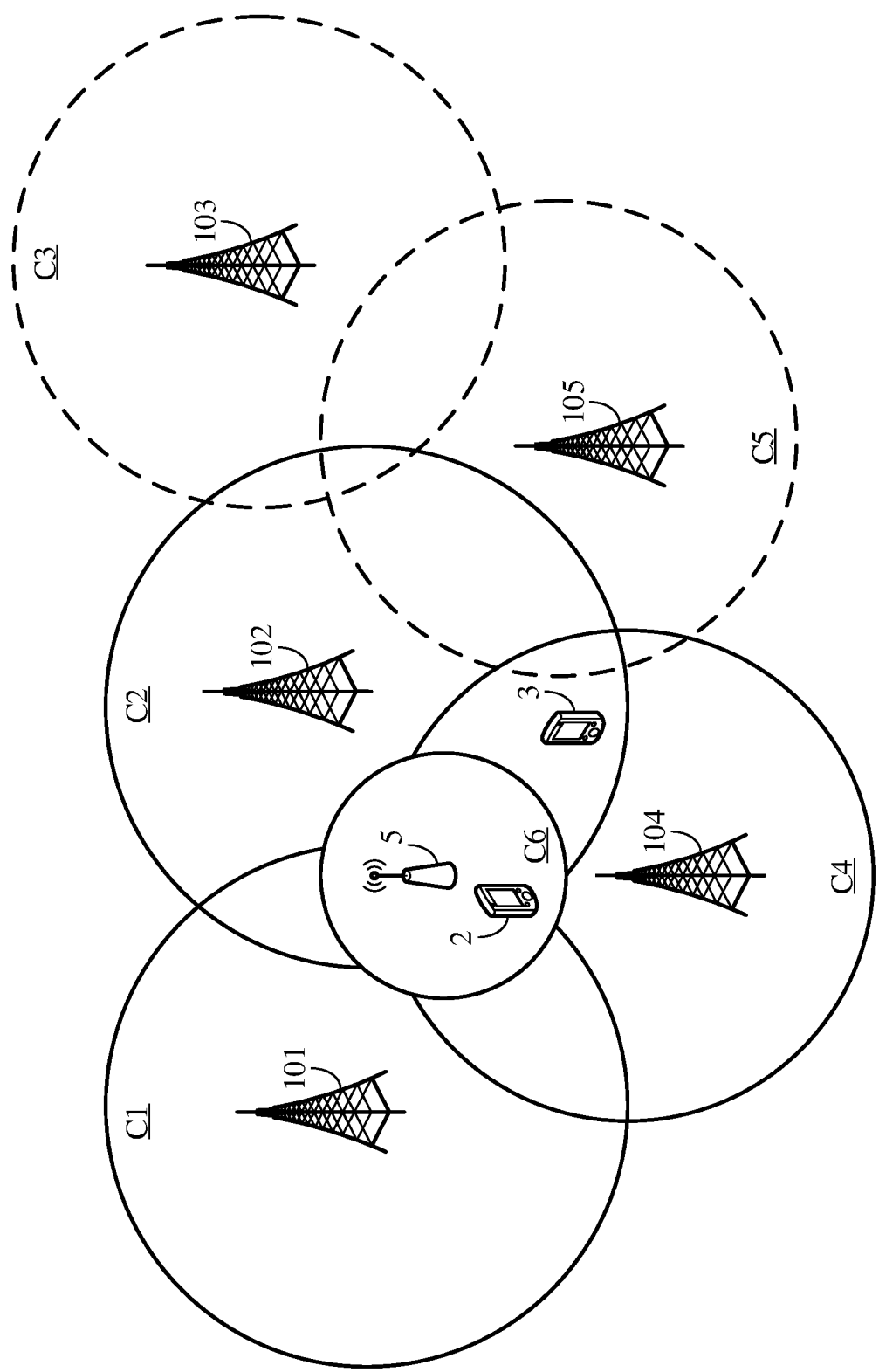
FIG. 5 depicts an implementation scenario of threat detection according to the present invention.
Figure 6:
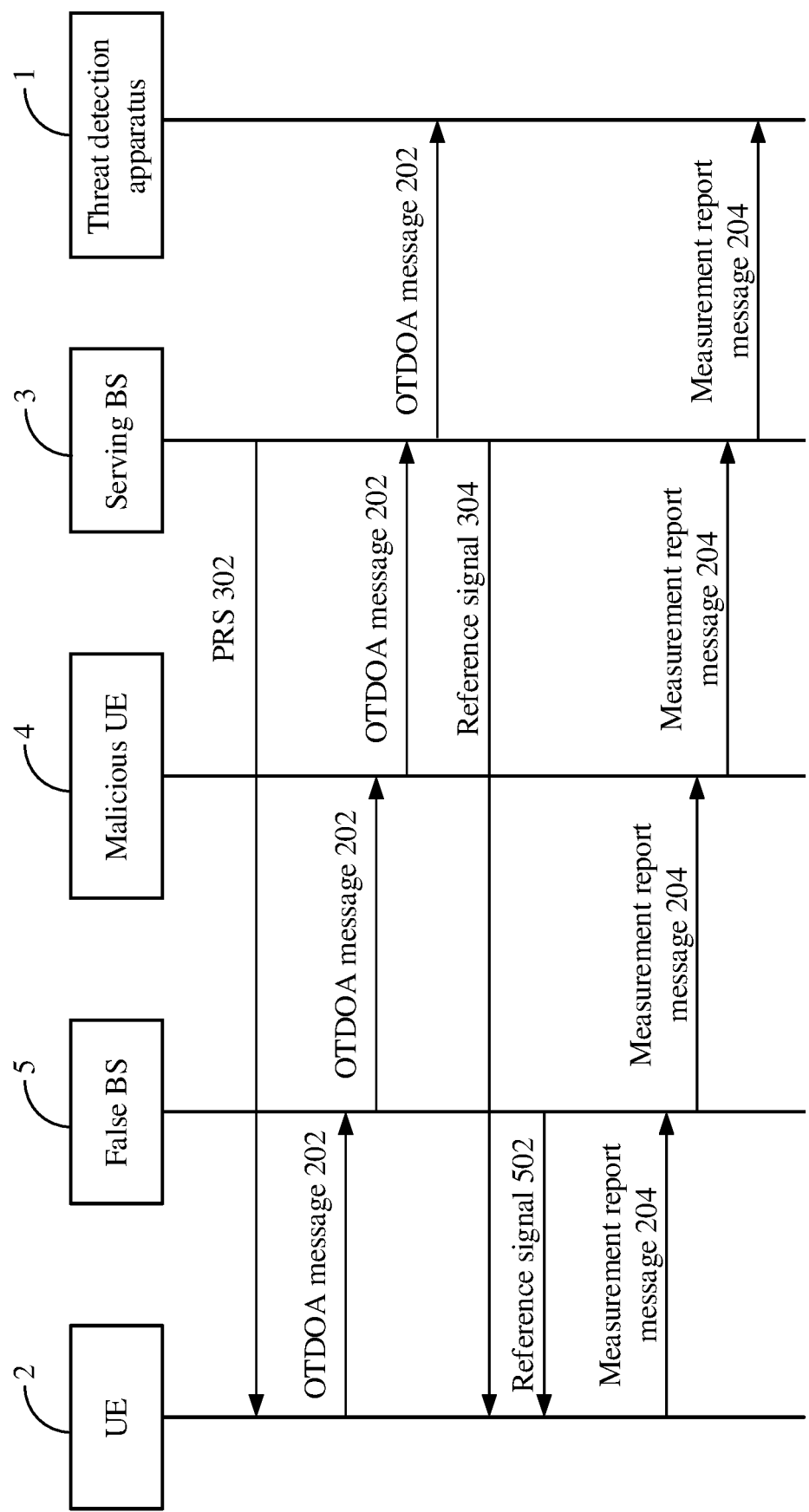
FIG. 6 is a schematic view of signal transmission according to the present invention.

Please refer to both FIGS. 5 and 6. If the target which the false BS 5 pretend to be is the authorized BS 104, the false system information transmitted by the false BS 5 is the same as the system information transmitted by the authorized BS 104. As aforementioned, when the UE 2 connects to the false BS 5, the false BS 5 uses the malicious UE 4 to connect to the authorized BS 104 to build a false appearance that the UE 2 connects to the authorized BS 104 so that the UE 2 recognized that the serving BS 3, which the UE 2 connects to, is the authorized BS 104.

Since the UE 2 is located within the signal coverage C4 of the authorized BS 104, the identity list included in the OTDOA message 202 generated by the UE 2 after measuring the PRSs during the signal measurement procedure shall include the identity of the authorized BS 104 even the false BS 5 does not have the capability to copy the PRS of an authorized BS. Thus, when the identity of the authorized BS 104 is on the identity list, the threat detection apparatus 1 will further request the UE 2 to transmit a measurement report message 204.

In details, in response to the request from the threat detection apparatus 1, the UE 2 will measure the reference signal transmitted by the BS which the UE 2 connects to. Based on the measured reference signal received power (RSRP), the UE 2 generates the measurement report message 204 carrying the RSRP information and transmits the measurement report message 204 to the threat detection apparatus 1. The reference signal may be the channel state information reference signal (CSI-RS) or the synchronization signal block (SS block), but not limited thereto.

Since the UE 2 connects to the false BS 5, the reference signal measured by the UE 2 in fact is the reference signal 502 transmitted by the false BS 5 rather than the reference signal 304 transmitted by the serving BS 3. Under such circumstance, after receiving the measure report message 204 from the serving BS 3, the threat detection apparatus 1 will calculate a first distance between the UE 2 and the BS which the UE 2 connects to according to the measurement report message 204, and calculate a second distance between the UE 2 and the serving BS 3 (i.e., the authorized BS 104) according to the position of the UE 2 (i.e., the position which is positioned according to the OTDOA message 202). Next, the threat detection apparatus 1 determines whether a difference between the first distance and the second distance is larger than a threshold. If the difference is larger than the threshold, it means that the reference signal measured by the UE 2 is not the reference signal 304 transmitted by the serving BS 3 and is the reference signal 502 transmitted by the false BS 5. Thus, threat detection apparatus 1 determines that the UE 2 connects to a false BS (i.e., the false BS 5).

It shall be appreciated that in addition to the BS identity, the relevant identity of the BS may also be the PRS identity, or further include the PRS identity. Thus, in the case that the identity includes both the BS identity and the PRS identity, after receiving the OTDOA message 202, the threat detection apparatus 1 not only determines whether the BS identity of the serving BS 3 is on the identity list, but also needs to determines whether the PRS identity of the PRS transmitted by the serving BS 3 is on the identity list so as to determines whether the UE 2 connects to the false BS 5.

Besides, in other embodiments, each authorized BS may include a plurality of transmission-reception points (TRPs) or be constituted by a plurality of TRPs. Through the UE 2 to measure the PRSs transmitted by the TRPs of each authorized BS, the accuracy of determination of the position of the UE 2 by the threat detection apparatus 1 will be increased, and the accuracy of determination of whether the UE 2 connects to the false BS 5 by the threat detection apparatus 1 will be increased if the identity included in the OTDOA message 202 further include the TRP identity. Thus, in the case that the identity includes both the BS identity, the PRS identity and TRP identity, after receiving the OTDOA message 202, the threat detection apparatus 1 not only determines whether the BS identity of the serving BS 3 is on the identity list, but also needs to determines whether the PRS identities and TRP identities corresponding to the TRPs are also on the identity list so as to determines whether the UE 2 connects to the false BS 5.

Figure 7:
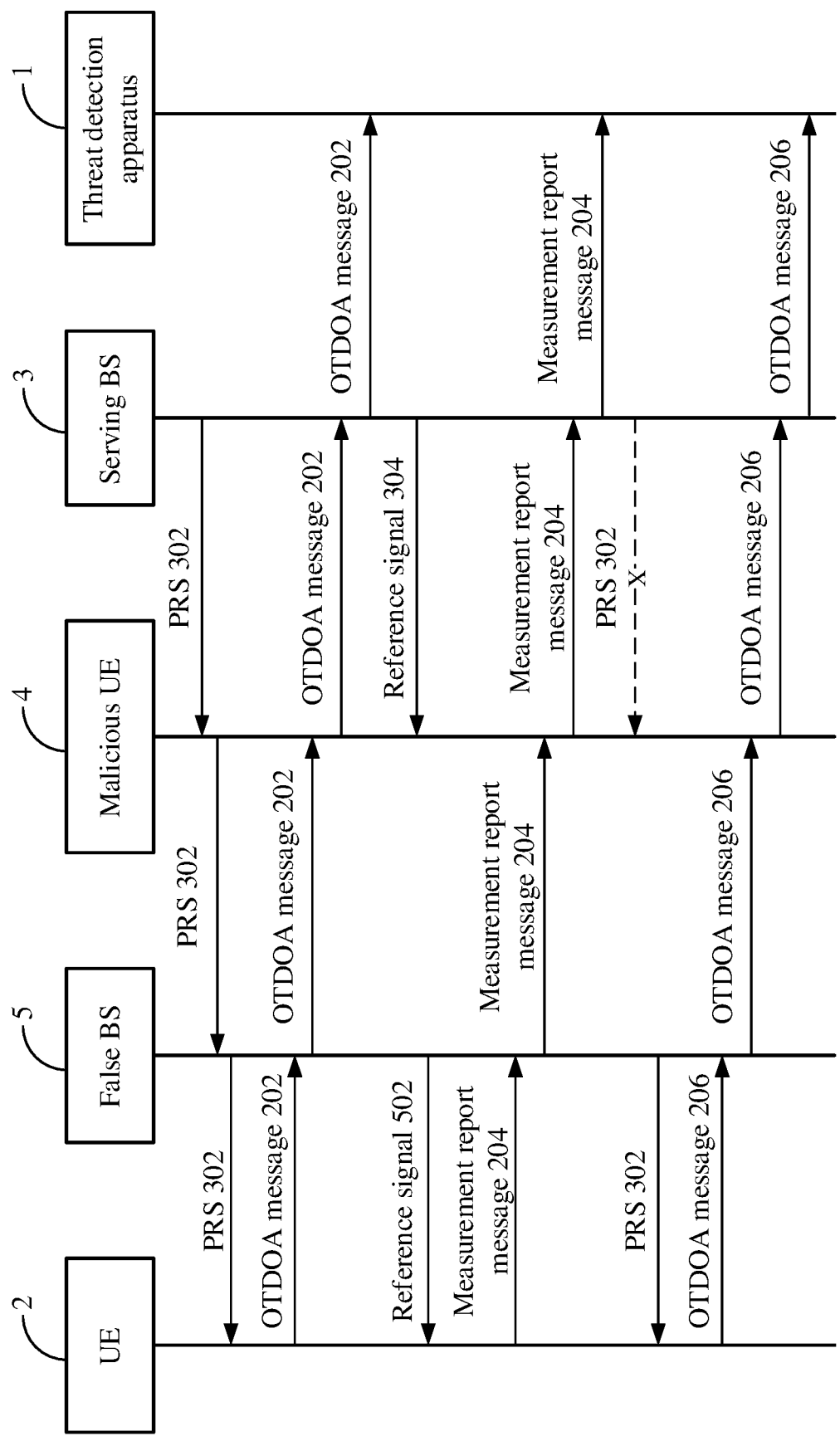
FIG. 7 is a schematic view of signal transmission according to the present invention.
Figure 8:
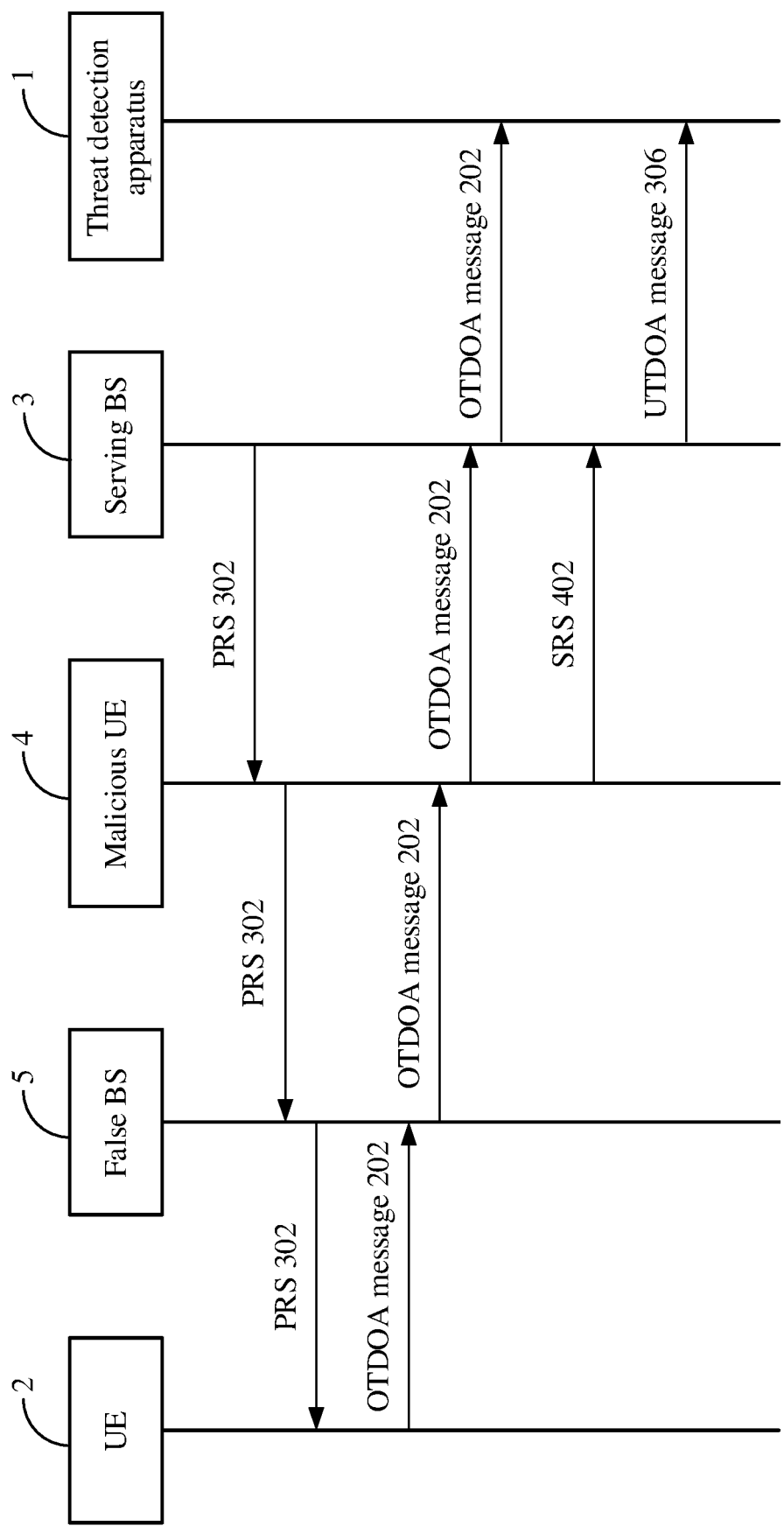
FIG. 8 is a schematic view of signal transmission according to the present invention.

The second embodiment of the present invention is as shown in FIGS. 3 and 7. The second embodiment is an extension of the first embodiment. In this embodiment, it assumes that the false BS 5 has the capability to copy the PRS 302, so the identity of the authorized BS 103 or the identity of the authorized BS 104 will be on the identity list no matter whether the position of the UE 2 is within the signal coverage of the authorized BS which the false BS 5 pretend to be (e.g., the authorized BS 103 or the authorized BS 104 illustrated in the first embodiment).

As aforementioned, the threat detection apparatus 1 can also execute all the operations described in the first embodiment to determines whether the UE 2 connects to the false BS 5 according to the difference between the first distance and the second distance through calculating the first distance between the UE 2 and the BS transmitting the reference signal and calculating the second distance the UE 2 and the serving BS 3. However, in some cases (e.g., when the distance between the false BS 5 and the UE 2 is close to the distance between the authorized BS being pretended to and the UE 2, or when the false BS 5 further has the capability to adjust the transmission power of the reference signal 502), the difference between the first and second distances calculated by the threat detection apparatus 1 may not be larger than the threshold and the threat detection apparatus 1 will not determines that the UE 2 connects to the false BS 5.

Taking the above cases into consideration, the threat detection apparatus 1 of the present invention can determine whether the UE 2 connects to the false BS 5 through a further testing. Specifically, regarding the PRS, the core network stipulates that each authorized BS can be transmit the PRS within fixed downlink time intervals. As mentioned above, if the false BS 5 has the capability to copy the PRS, the UE 2 could measure the PRS of the authorized BS being pretended to within these downlink time intervals stipulated by the core network.

Under such circumstance, the threat detection apparatus 1 can further request the UE 2 to perform the positioning measurement again when determining the difference between the first distance and the second distance is smaller than or equal to the threshold. In the meantime, the threat detection apparatus 1 transmits a control message to the serving BS 3 (i.e., the authorized BS 103 or the authorized BS 104) to make the serving BS 3 to stop transmitting the PRS 302 within a time interval. In other words, the threat detection apparatus 1 purposely request the serving BS 3 to stop transmitting the PRS 302 within the time interval at which the UE 2 is performing another positioning measurement.

Within the above time interval, since the false BS 5 still transmits the same PRS 302 as that of the authorized being pretended to (i.e., the serving BS 3), the identity of the serving BS 3 would be on another identity list included in another OTDOA message 206 generated by the UE 2 measuring the PRS 302 within the time interval. However, it can be understood that in fact, the identity of the serving BS 3 shall not be on the identity list included in the OTDOA message 206.

The OTDOA message 206 is transmitted to the threat detection apparatus 1 via the false BS 5, the malicious UE 4 and the serving BS 3. After receiving the another OTDOA message 206 from the serving BS 3 within the time interval, the threat detection apparatus 1 determines whether the identity of the serving BS 3 is on the identity list. In the case that the serving BS 3 does not transmit the PRS 302, the threat detection apparatus 1 will determine that the UE 2 connects to a false BS (i.e., the false BS 5) if the identity of the serving BS 3 is still on the another identity list.

Please refer to FIGS. 3、5、8 for the third embodiment of the present invention. Different from the first and second embodiments, the threat detection apparatus 1 in this embodiment determines whether the UE 2 connects to the false BS 5 by using the OTDOA positioning procedure and the uplink time difference of arrival (UTDOA) positioning procedure respectively.

As mentioned in the first embodiment, the UE 2 measures the PRSs 302 transmitted by the authorized BSs, and generates the OTDOA message 202. Since the UE 2 connects to the false BS 5, the OTDOA message 202 generated by the UE 2 will be received by the false BS 5, then is transmitted from the false BS 5 to the serving BS 3 via the malicious UE 4, and finally transmitted from the serving BS 3 to the threat detection apparatus 1. Therefore, the threat detection apparatus 1 calculates the first positon of the UE 2 based on the OTDOA message 202.

Next, the threat detection apparatus 1 further calculates the position of the UE 2 based on the UTODA positioning procedure. The threat detection apparatus 1 instructs the UE 2 to transmit a sounding reference signal (SRS) for being measured by the serving BS 3 and the authorized BSs assigned by the threat detection apparatus 1. However, since the uplink resource scheduled and allocated to the UE 2 for transmitting the SRS has its immediacy, it will not meet the requirement of immediacy if the SRS is transmitted by the UE 2 which is informed by the false BS 5 about the instruction received by the malicious UE 4. As a result, the unscrupulous person who operates the false BS 5 will usually plan to transmit the SRS 402 by the malicious UE 4 to prevent the false BS 5 from being detected if the SRS is not transmitted.

Each of the serving BS 3 and the assigned authorized BSs will individually generate an UTDOA message 306 after measuring the SRS 402, and transmit the UTDOA message 306 generated by itself to the threat detection apparatus 1. The threat detection apparatus 1 calculates a second position of the UE 2 based on these UTDOA messages 306 received from the serving BS 3 and the assigned authorized BSs respectively. It shall be appreciated that for the threat detection apparatus 1, before determining that the UE 2 connects to the false BS 5 and the UE connecting to the serving BS 3 is the malicious UE 4, the position through the UTDOA positioning in theory shall belong to the UE 2 so that the threat detection apparatus 1 still supposes that the second position calculated based on these UTDOA messages 306 is the position of the UE 2.

After calculating the first and second positions of the UE 2 in response to the downlink positioning procedure and the uplink positioning procedure, the threat detection apparatus 1 determines whether a distance difference between the first position and the second position is larger than a threshold. When the distance difference is larger than the threshold, the threat detection apparatus 1 would determine that the SRS 402 measured by the BSs (including the serving BS 3) is generated by the malicious UE 4 and the UE 2 connects to the false BS 5. By this way, the threat detection apparatus 1 can learn whether the UE 2 connects to the false BS 5 by using both the UTDOA positioning procedure and the OTDOA positioning procedure.

Similarly, in other embodiments, each of the authorized BSs includes a plurality of transmission-reception points (TRPs) or be constituted by a plurality of TRPs, thereby increasing the positioning accuracy of the UTDOA positioning procedure and the OTDOA positioning procedure.

Figure 9:
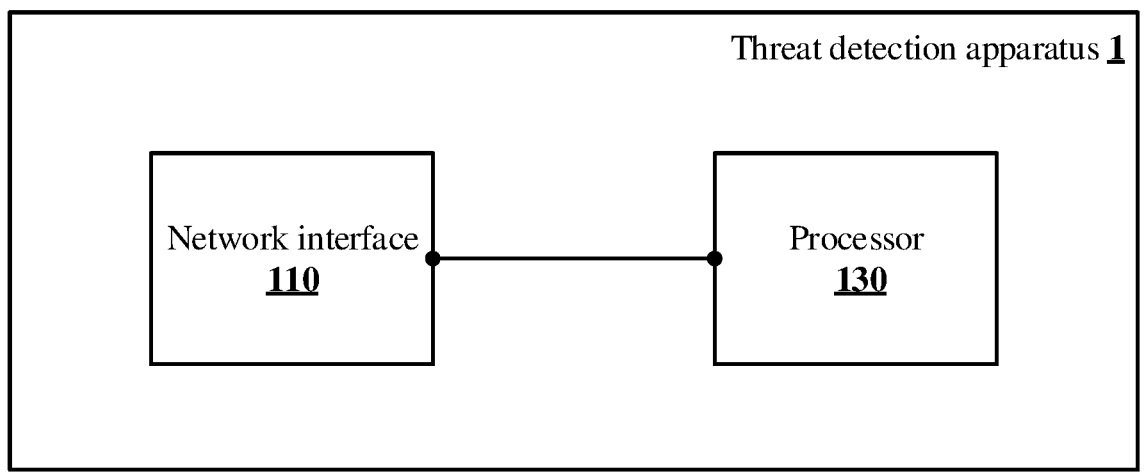
FIG. 9 is a schematic view of the threat detection apparatus 1 according to the present invention.

A fourth embodiment of the present invention is as shown in FIG. 9, which is a schematic view of the threat detection apparatus 1 according to the present invention. The wireless communication system includes a core network and a plurality of authorized BSs. The threat detection apparatus 1 belongs to the core network and includes a network interface 110 and a processor 130. It shall be appreciated that, for simplifying the description, other components of the threat detection apparatus 1 such as the storage, the housing, the power supply module and other components irrelevant to the present invention are omitted from depiction in the drawings. The network interface 110 is configured to connect to the authorized BSs.

Corresponding to the first embodiment, the processor 130 is electrically connected to the network interface 110 and receives an OTDOA message from a serving BS of the authorized BSs via the network interface 110. The processor 130 calculates a position of a UE (e.g., the UE 2 as aforementioned) according to the OTDOA message. The OTDOA message is generated by the UE and includes an identity list. The processor 130 determines whether an identity of the serving BS is on the identity list. When the identity of the serving BS is not on the identity list, the processor 130 determines that the UE connects to a false BS.

When the identity of the serving BS is on the identity list, the processor 130 further receives a measurement report message from the serving BS via the network interface 110. The measurement report message is generated by the UE through measuring a reference signal transmitted by a BS. The processor 130 calculates a first distance between the UE and the BS according to the measurement report message, and calculates a second distance between the UE and the serving BS according to the position of the UE. The processor 130 determines whether a difference between the first distance and the second distance is larger than a threshold. When the difference is larger than the threshold, the processor 130 determines that the UE connects to the false BS and the BS transmitting the reference signal is the false BS.

In one embodiment, false system information transmitted by the false BS is identical to system information transmitted by the serving BS. In one embodiment, the measurement report message includes reference signal received power (RSRP) information.

In one embodiment, the identity includes a BS identity. In other embodiments, the identity further includes a positioning reference signal (PRS) identity. In other embodiment, each of the authorized BSs includes a plurality of transmission-reception points (TRPs), and the identity further includes a TRP identity.

Corresponding to the second embodiment, when the difference is smaller than or equal to the threshold, the processor 130 further transmits a control message to the serving BS via the network interface 110 to make the serving BS stop transmitting a positioning reference signal within a time interval. Next, the processor 130 receives another OTDOA message from the serving BS within the time interval via the network interface 110. The another OTDOA message is generated by the UE and includes another identity list. The processor 130 determines whether the identity of the serving BS is on the another identity list. When the identity of the serving BS is on the another identity list, the processor 130 determines that the UE connects to the false BS and the BS transmitting the reference signal is the false BS.

Please still refer to FIG. 9 for the fifth embodiment of the present invention which corresponding to the third embodiment. In this embodiment, the processor 130 receives an OTDOA message from a serving BS of the authorized BSs via the network interface 110. The OTDOA message is generated by a UE. The processor 130 calculates a first position of the UE according to the OTDOA message. Afterwards, the processor 130 receives an UTDOA message from each of the serving BS and a plurality of assigned BSs of the authorized BSs via the network interface 110, and calculates a second position of the UE according to the UTDOA messages. Next, the processor 130 determines whether a distance difference between the first position and the second position is larger than a threshold. When the distance difference is larger than the threshold, the processor 130 determines that the UE connects to a false BS.

In one embodiment, false system information transmitted by the false BS is identical to system information transmitted by the serving BS. In one embodiment, each of the authorized BSs comprises a plurality of transmission-reception points (TRPs). In other embodiments, the UTDOA messages are generated by the serving BS and the assigned BSs through measuring a sounding reference signal (SRS). In other embodiments, when the distance difference is larger than the threshold, the processor 130 determines that the sounding reference signal is generated by a malicious UE and the malicious UE is connected to the false BS.

Figure 10A:
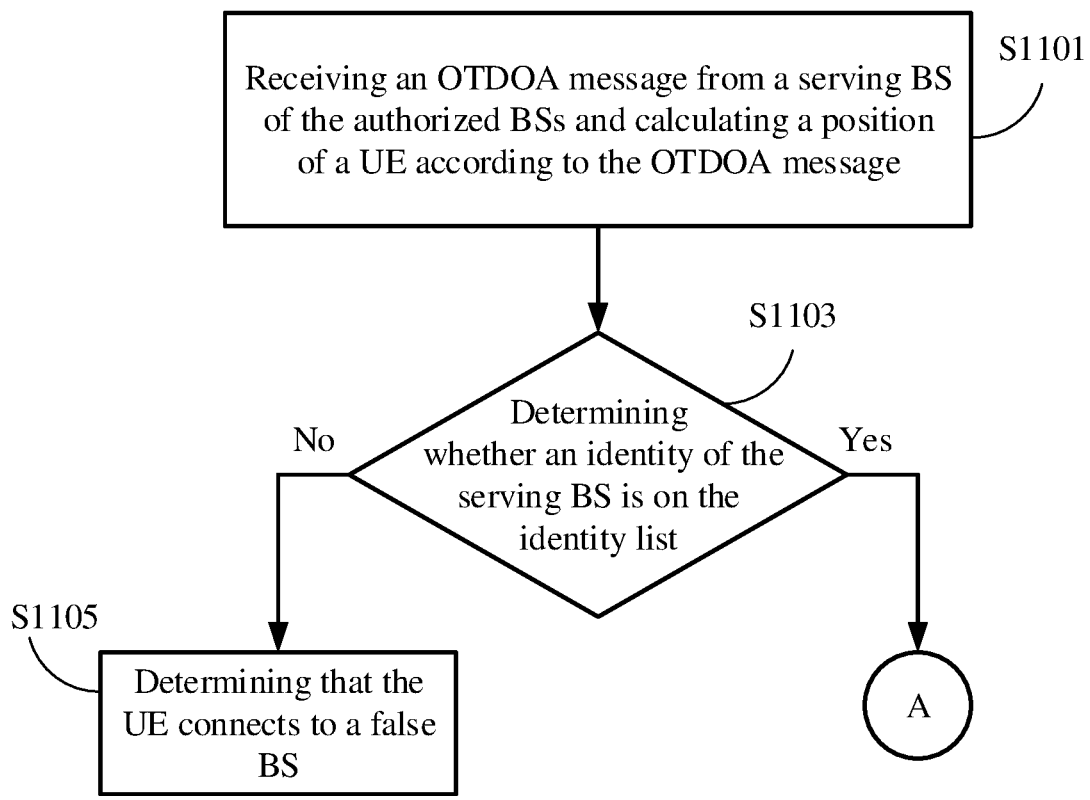
FIGS. 10A-10B are a flow chart of a threat detection method according to the present invention.
Figure 10B:
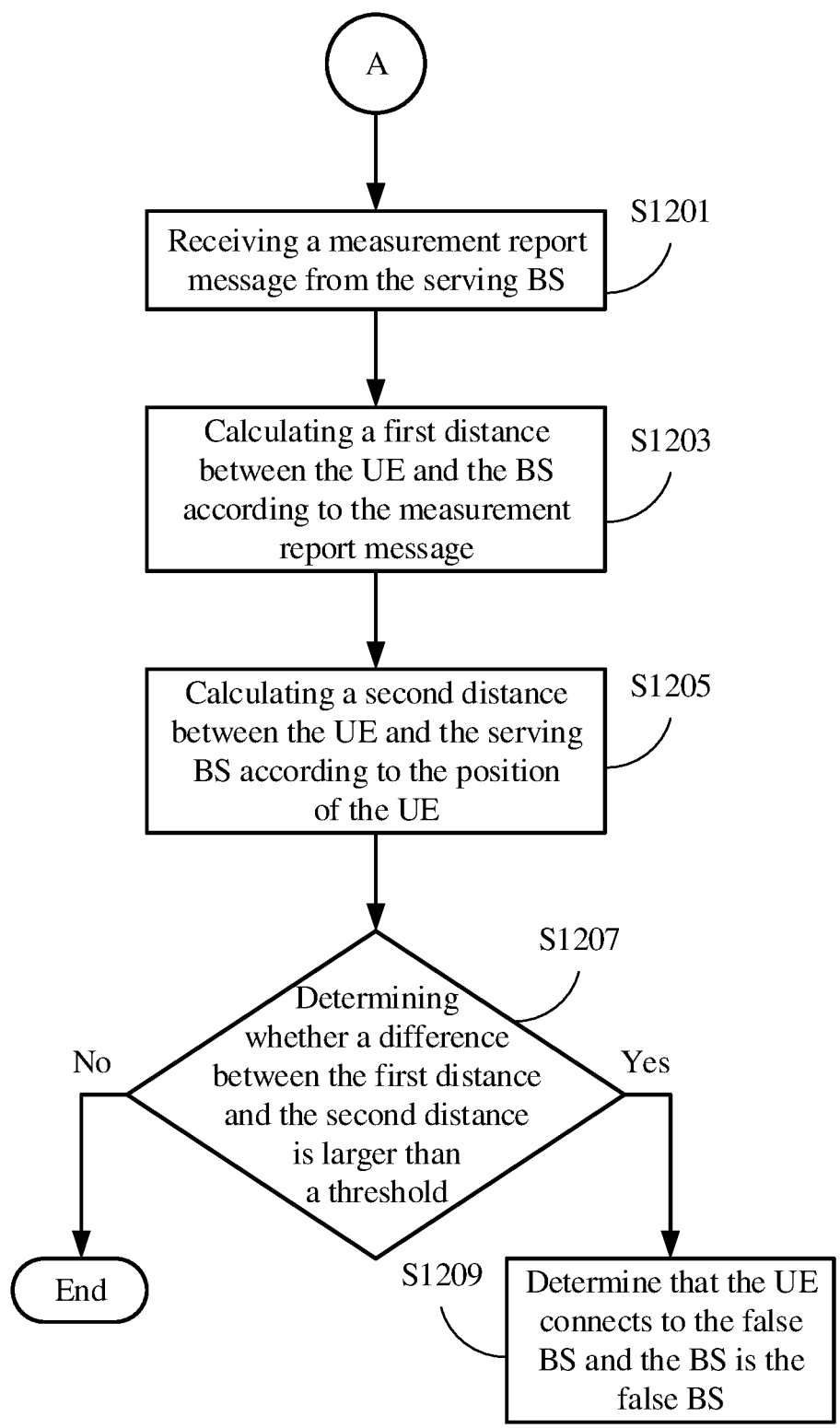

A sixth embodiment of the present invention describes a threat detection method, and a flowchart diagram thereof is as shown in FIGS. 10A-10B. The threat detection method is adapted for use in a wireless communication system. The wireless communication system includes a core network and a plurality of authorized BSs. The core network includes a threat detection apparatus (e.g., the aforementioned threat detection apparatus 1). The threat detection apparatus includes a network interface and a processor. The threat detection method is executed by the processor and the following steps thereof are described as follows.

Step S1101 is executed to receive an OTDOA message from a serving BS of the authorized BSs and calculate a position of a UE according to the OTDOA message. The OTDOA message is generated by the UE and includes an identity list. Step S1103 is executed to determine whether an identity of the serving BS is on the identity list. When the identity of the serving BS is not on the identity list, step S1105 is executed to determine that the UE connects to a false BS.

When the identity of the serving BS is on the identity list, the threat detection method further executes the steps as illustrated in FIG. 10B. Step S1201 is executed to receive a measurement report message from the serving BS. The measurement report message is generated by the UE through measuring a reference signal transmitted by a BS. Step S1203 is executed to calculate a first distance between the UE and the BS according to the measurement report message. Step S1205 is executed to calculate a second distance between the UE and the serving BS according to the position of the UE. Step S1207 is executed to determine whether a difference between the first distance and the second distance is larger than a threshold. When the difference is larger than the threshold, step S1209 is executed to determine that the UE connects to the false BS and the BS is the false BS.

In one embodiment, false system information transmitted by the false BS is identical to system information transmitted by the serving BS. In one embodiment, the measurement report message includes reference signal received power (RSRP) information.

In one embodiment, the identity includes a BS identity. In other embodiments, the identity further includes a positioning reference signal (PRS) identity. In other embodiment, each of the authorized BSs includes a plurality of transmission-reception points (TRPs), and the identity further includes a TRP identity.

In other embodiments, when the difference is smaller than or equal to the threshold, the threat detection method further includes the following steps: transmitting a control message to the serving BS via the network interface to make the serving BS stop transmitting a positioning reference signal within a time interval; receiving another OTDOA message from the serving BS within the time interval via the network interface, the another OTDOA message being generated by the UE and comprising another identity list; determining whether the identity of the serving BS is on the another identity list; and when the identity of the serving BS is on the another identity list, determining that the UE connects to the false BS and the BS is the false BS.

In addition to the aforesaid steps, the threat detection method of the present invention can also execute all the operations described in the aforesaid embodiments and have all the corresponding functions, and how this embodiment executes these operations and has these functions based on the aforesaid embodiments shall be readily appreciated by those of ordinary skill in the art, and thus will not be further described herein.

According to the above descriptions, the threat detection mechanism of the present invention is able to determine whether a UE connects a false BS based on the measurement message reported by the UE without need of modifying the current wireless communication protocols.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A threat detection apparatus for a wireless communication system, the wireless communication system comprising a core network and a plurality of authorized base stations (BSs), the threat detection apparatus belonging to the core network and comprising:
   a network interface, being configured to connect to the authorized BSs; and
   a processor electrically connected to the network interface, being configured to execute the following operations:
      receiving an observed time difference of arrival (OTDOA) message from a serving BS of the authorized BSs via the network interface and calculating a position of a user equipment (UE) according to the OTDOA message, the OTDOA message being generated by the UE and comprising an identity list;
      determining whether an identity of the serving BS is on the identity list; and
      determining that the UE connects to a false BS when the identity of the serving BS is not on the identity list;
   wherein when the identity of the serving BS is on the identity list, the processor further executes the following operations:
      receiving a measurement report message from the serving BS via the network interface, the measurement report message being generated by the UE through measuring a reference signal transmitted by a BS;
      calculating a first distance between the UE and the BS according to the measurement report message;
      calculating a second distance between the UE and the serving BS according to the position;
      determining whether a difference between the first distance and the second distance is larger than a threshold; and
      when the difference is larger than the threshold, determining that the UE connects to the false BS and the BS is the false BS.

2. The threat detection apparatus of claim 1, wherein false system information transmitted by the false BS is identical to system information transmitted by the serving BS.

3. The threat detection apparatus of claim 1, wherein the measurement report message comprises reference signal received power (RSRP) information.

4. The threat detection apparatus of claim 1, wherein the identity comprises a BS identity.

5. The threat detection apparatus of claim 4, wherein the identity further comprises a positioning reference signal (PRS) identity.

6. The threat detection apparatus of claim 5, wherein each of the authorized BSs comprises a plurality of transmission-reception points (TRPs), and the identity further comprises a TRP identity.

7. The threat detection apparatus of claim 1, wherein when the difference is smaller than or equal to the threshold, the processor further executes the following operations:
   transmitting a control message to the serving BS via the network interface to make the serving BS stop transmitting a positioning reference signal within a time interval;
   receiving another OTDOA message from the serving BS within the time interval via the network interface, the another OTDOA message being generated by the UE and comprising another identity list;
   determining whether the identity of the serving BS is on the another identity list; and
   when the identity of the serving BS is on the another identity list, determining that the UE connects to the false BS and the BS is the false BS.

8. A threat detection method for a wireless communication system, the wireless communication system comprising a core network and a plurality of authorized base stations (BSs), the core network comprising a threat detection apparatus, the threat detection apparatus comprising a network interface and a processor, the threat detection method is executed by the processor and comprises:

receiving an observed time difference of arrival (OTDOA) message from a serving BS of the authorized BSs and calculating a position of a user equipment (UE) according to the OTDOA message, the OTDOA message being generated by the UE and comprising an identity list;

determining whether an identity of the serving BS is on the identity list; and determining that the UE connects to a false BS when the identity of the serving BS is not on the identity list;

wherein when the identity of the serving BS is on the identity list, the threat detection method further comprises the following steps:

receiving a measurement report message from the serving BS, the measurement report message being generated by the UE through measuring a reference signal transmitted by a BS;

calculating a first distance between the UE and the BS according to the measurement report message;

calculating a second distance between the UE and the serving BS according to the position;

determining whether a difference between the first distance and the second distance is larger than a threshold; and when the difference is larger than the threshold, determining that the UE connects to the false BS and the BS is the false BS.

9. The threat detection method of claim 8, wherein false system information transmitted by the false BS is identical to system information transmitted by the serving BS.

10. The threat detection method of claim 8, wherein the measurement report message comprises reference signal received power (RSRP) information.

11. The threat detection method of claim 8, wherein the identity comprises a BS identity.

12. The threat detection method of claim 11, wherein the identity further comprises a positioning reference signal (PRS) identity.

13. The threat detection method of claim 12, wherein each of the authorized BSs comprises a plurality of transmission-reception points (TRPs), and the identity further comprises a TRP identity.

14. The threat detection method of claim 8, wherein when the difference is smaller than or equal to the threshold, the threat detection method further comprising:

transmitting a control message to the serving BS to make the serving BS stop transmitting a positioning reference signal within a time interval;

receiving another OTDOA message from the serving BS within the time interval, the another OTDOA message being generated by the UE and comprising another identity list;

determining whether the identity of the serving BS is on the another identity list; and when the identity of the serving BS is on the another identity list, determining that the UE connects to the false BS and the BS is the false BS.

15. A threat detection apparatus for a wireless communication system, the wireless communication system comprising a core network and a plurality of authorized base stations (BSs), the threat detection apparatus belonging to the core network and comprising:

a network interface, being configured to connect to the authorized BSs; and a processor electrically connected to the network interface, being configured to execute the following operations:

receiving an observed time difference of arrival (OTDOA) message from a serving BS of the authorized BSs via the network interface, the OTDOA message being generated by a user equipment (UE);

calculating a first position of the UE according to the OTDOA message;

receiving an uplink time difference of arrival (UTDOA) message from each of the serving BS and a plurality of assigned BSs of the authorized BSs via the network interface;

calculating a second position of the UE according to the UTDOA messages;

determining whether a distance difference between the first position and the second position is larger than a threshold; and determining that the UE connects to a false BS when the distance difference is larger than the threshold.

16. The threat detection apparatus of claim 15, wherein false system information transmitted by the false BS is identical to system information transmitted by the serving BS.

17. The threat detection apparatus of claim 15, wherein each of the authorized BSs comprises a plurality of transmission-reception points (TRPs).

18. The threat detection apparatus of claim 15, wherein the UTDOA messages are generated by the serving BS and the assigned BSs through measuring a sounding reference signal (SRS).

19. The threat detection apparatus of claim 18, wherein when the distance difference is larger than the threshold, the processor determines that the sounding reference signal is generated by a malicious UE and the malicious UE is connected to the false BS.

* * * * *